United States Patent [19]
Sung

[11] Patent Number: 5,948,723
[45] Date of Patent: Sep. 7, 1999

[54] LAYERED CATALYST COMPOSITE

[75] Inventor: Shiang Sung, New York, N.Y.

[73] Assignee: Engelhard Corporation, Iselin, N.J.

[21] Appl. No.: 08/962,283

[22] Filed: Oct. 31, 1997

Related U.S. Application Data

[63] Continuation-in-part of application No. 08/834,906, Apr. 7, 1997, and a continuation-in-part of application No. 08/706, 480, Sep. 4, 1996.

[51] Int. Cl.$^6$ .............................. B01J 21/04; B01J 23/10
[52] U.S. Cl. ......................... 502/303; 502/302; 502/340; 502/341; 502/349
[58] Field of Search ................................ 502/303, 302, 502/340, 341, 349, 527.12, 527.13

[56] References Cited

U.S. PATENT DOCUMENTS

| | | | |
|---|---|---|---|
| 3,524,721 | 8/1970 | Stephens | 23/2 |
| 3,545,917 | 12/1970 | Stephens | 23/2 |
| 3,552,913 | 1/1971 | Stephens | 23/2 |
| 3,676,370 | 7/1972 | Stephens | 252/455 |
| 3,787,560 | 1/1974 | Stephens | 423/239 |
| 3,899,444 | 8/1975 | Stephens | 252/455 |
| 3,956,188 | 5/1976 | Hindin et al. | 252/465 |
| 3,993,572 | 11/1976 | Hindin et al. | 252/462 |

(List continued on next page.)

FOREIGN PATENT DOCUMENTS

| | | | |
|---|---|---|---|
| 615721 | 8/1989 | Australia . | |
| 0 556 554 A2 | 8/1993 | European Pat. Off. | B01D 53/36 |
| 50-145381 | 11/1975 | Japan . | |
| 57-105240 | 6/1982 | Japan . | |
| 59-052530 | 3/1984 | Japan . | |
| 60-019036 | 5/1985 | Japan . | |
| 50-31828 | 7/1985 | Japan . | |
| 60-232253 | 11/1985 | Japan . | |
| 71538 | 4/1987 | Japan . | |
| 63-007895 | 1/1988 | Japan . | |
| 63-077544 | 4/1988 | Japan . | |
| 63-205141 | 8/1988 | Japan . | |
| 63-240947 | 10/1988 | Japan . | |
| 01210032 | 8/1989 | Japan . | |
| 95/35152 | 12/1995 | WIPO | B01D 53/94 |
| WO 95/35152 | 12/1995 | WIPO | B01D 53/94 |
| WO96/17671 | 6/1996 | WIPO . | |
| WO 97/43035 | 11/1997 | WIPO | B01D 53/94 |
| 98/09726 | 3/1998 | WIPO | B01J 23/56 |
| WO 98/09726 | 3/1998 | WIPO | B01J 23/56 |

OTHER PUBLICATIONS

Abstract—Database WPI, Derwent Publications, Ltd., London, GB XP002063982 Jul. 1989.
Abstract—Database WPI, Derwent Publications, Ltd., London, GB XP002063983 Feb. 1988.
Abstract—Database WPI, Derwent Publications, Ltd., London, GB XP002063984 Apr. 1987.
M. Bhasin, et al., "Novel Catalyst for Treating Exhaust Gases from Internal Combustion and Stationary Source Engines", SAE 93054, 1993 no month.

*Primary Examiner*—Steven Bos
*Assistant Examiner*—Alexander G. Ghyka

[57] ABSTRACT

A catalyst composition and layered catalyst composite of the type generally referred to as a three-way conversion catalyst having the capability of substantially simultaneously catalyzing the oxidation of hydrocarbons and carbon monoxide and the reduction of nitrogen oxides. The catalyst composition comprises at least two supports, at least one first precious metal component. There is at least one lanthana stabilized alumina support, and at least one refractory oxide unstabilized support. The composition further comprises at least one precious metal component located on the lanthana stabilized alumina support and the unstabilized support. There is an oxygen storage composition comprising, 40 to 80 weight percent of a diluent component, 10 to 60 weight percent of a cerium component, 1 to 15 weight percent of a neodymium component, and 1 to 15 weight percent of a praseodymium component. The composition also comprises at least one alkaline earth metal stabilizer; and a zirconium component.

21 Claims, 4 Drawing Sheets

U.S. PATENT DOCUMENTS

| | | | |
|---|---|---|---|
| 4,021,185 | 5/1977 | Hindin et al. | 431/7 |
| 4,134,860 | 1/1979 | Hindin et al. | 252/466 |
| 4,157,316 | 6/1979 | Thompson et al. | 252/462 |
| 4,171,288 | 10/1979 | Keith et al. | 252/462 |
| 4,189,404 | 2/1980 | Keith et al. | 252/462 |
| 4,294,726 | 10/1981 | Boxon et al. | 252/462 |
| 4,438,219 | 3/1984 | Brandenburg et al. | 502/333 |
| 4,476,246 | 10/1984 | Kim et al. | 502/304 |
| 4,504,598 | 3/1985 | Ono et al. | 502/303 |
| 4,587,231 | 5/1986 | Sawamura et al. | 502/304 |
| 4,591,518 | 5/1986 | Schillinger et al. | 427/385.5 |
| 4,591,578 | 5/1986 | Foley et al. | 502/185 |
| 4,591,580 | 5/1986 | Kim et al. | 502/303 |
| 4,624,940 | 11/1986 | Wan et al. | 502/251 |
| 4,708,946 | 11/1987 | Ohata et al. | 502/304 |
| 4,714,694 | 12/1987 | Wan et al. | 502/304 |
| 4,727,052 | 2/1988 | Wan et al. | 502/327 |
| 4,757,045 | 7/1988 | Turner et al. | 502/252 |
| 4,780,447 | 10/1988 | Kim et al. | 502/243 |
| 4,806,519 | 2/1989 | Chiba et al. | 502/252 |
| 4,808,564 | 2/1989 | Matsumoto et al. | 502/303 |
| 4,923,842 | 5/1990 | Summers | 502/261 |
| 4,965,243 | 10/1990 | Yamada et al. | 502/304 |
| 5,057,483 | 10/1991 | Wan | 502/304 |
| 5,212,142 | 5/1993 | Dettling | 502/304 |
| 5,254,519 | 10/1993 | Wan et al. | 502/252 |
| 5,597,771 | 1/1997 | Hu et al. | 502/304 |

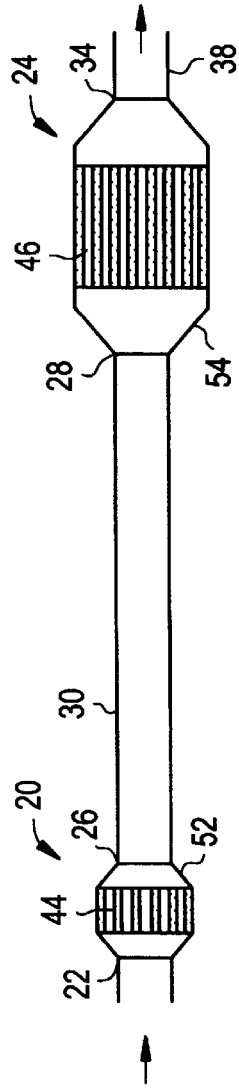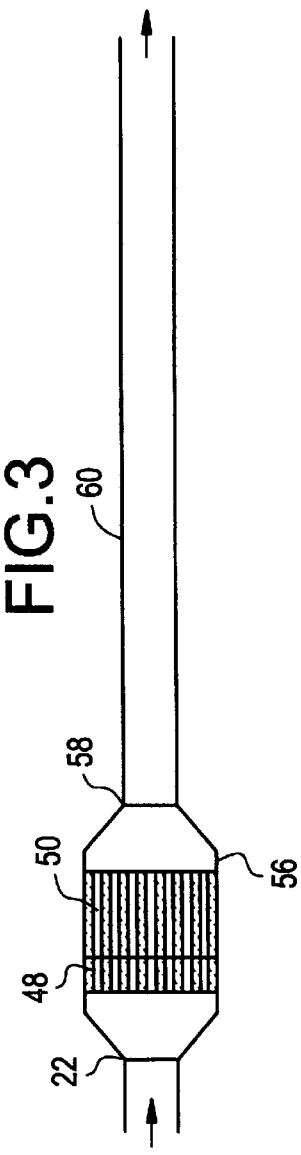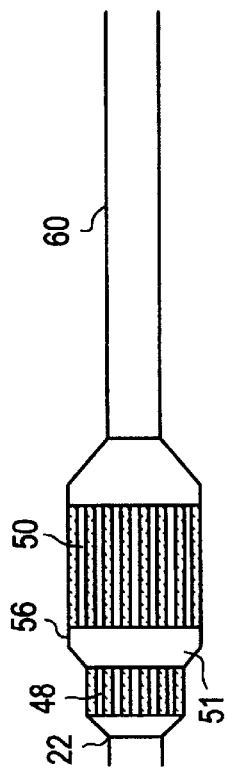

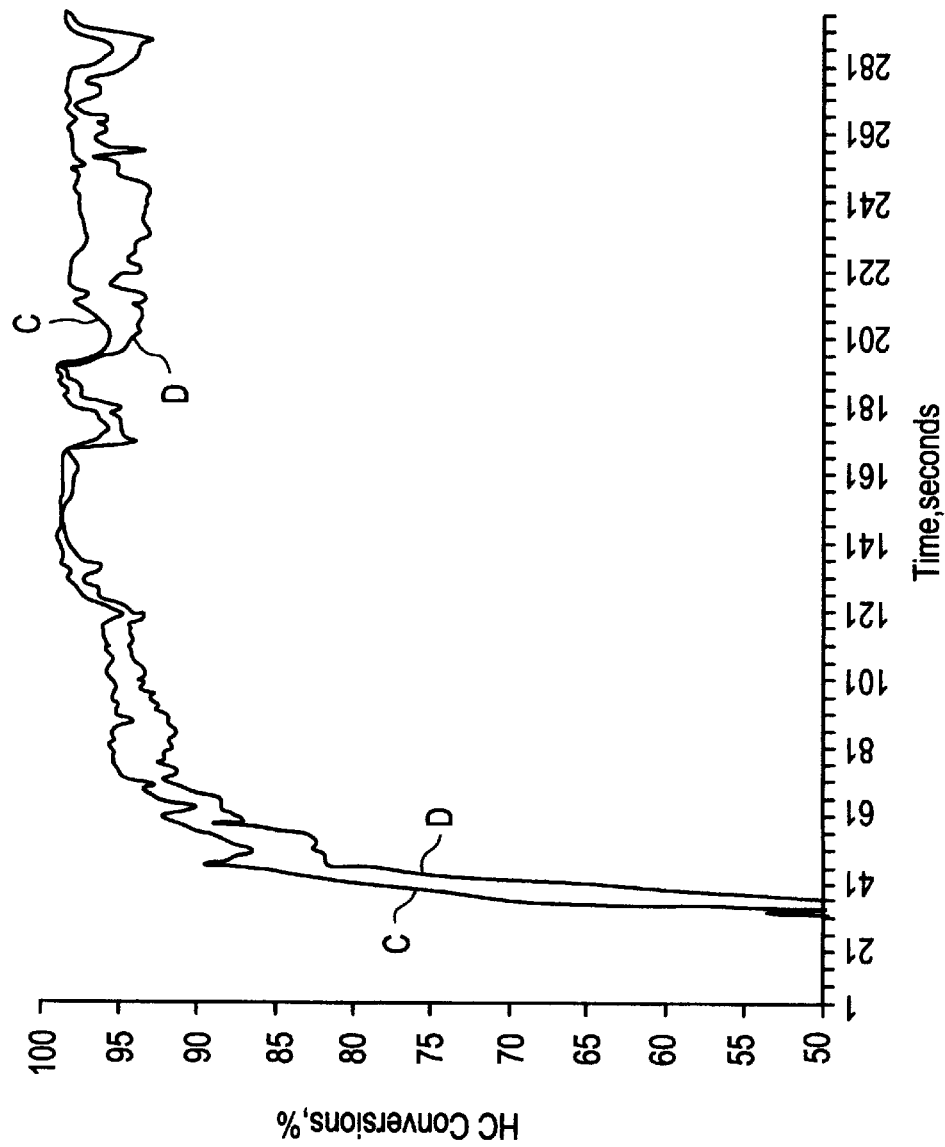

LAYERED CATALYST COMPOSITE

This application is cip of Ser. No. 08/0834,906 filed Apr. 7, 1997 and a cip of Ser. No. 08/706,480 filed Sep. 4, 1996.

BACKGROUND OF THE INVENTION

1. Field of the Invention

The present invention relates to a catalyst composition and a layered catalyst composite useful as a close-coupled catalyst, an article comprising a close-coupled catalyst and method useful for the treatment of gases to reduce contaminants contained therein. More specifically, the present invention is concerned with improved catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides. An embodiment of the present invention relates to catalysts of the type generally referred to as "close coupled catalysts" which are designed to reduce pollutants in engine exhaust emissions during engine cold start conditions.

2. Background of the Invention

Three-way conversion catalysts have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

High surface area alumina support materials, also referred to as "gamma alumina" or "activated alumina", typically exhibit a BET surface area in excess of 60 meters square per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith, et al., U.S. Pat. No. 4,171,288.

Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan, et al., discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan, et al. and in U.S. Pat. No. 4,708,946 of Ohata, et al.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina supported catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide. Palladium containing catalyst compositions, e.g., U.S. Pat. No. 4,624,940, have been found useful for high temperature applications. The combination of lanthanum and barium is found to provide a superior hydrothermal stabilization of alumina which supports the catalytic component, palladium.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° C. to 700° C. in air after which the material is impregnated with an aqueous solution of a salt of platinum and a salt of rhodium dried and subsequently treated in a hydrogen-containing gas at a temperature of 250° C. to 650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is disclosed as an $H_2S$ gettering compound.

U.S. Pat. No. 4,965,243 discloses a method to improve thermal stability of a TWC catalyst containing precious metals by incorporating a barium compound and a zirconium compound together with ceria and alumina. This is disclosed to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound. These patents suggest the utility of alkaline earth metals in combination with ceria, and zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g., co-precipitated) ceria-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or other activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545,917, 3,524,721 and 3,899,444 all disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, cerium, praseodymium, neodymium and others.

TWC catalyst systems comprising a carrier and two or more layers of refractory oxide are disclosed.

For example, Japanese Patent Publication No. 145381/1975 discloses a catalyst-supported structure for purifying exhaust gases comprising a thermally insulating ceramic carrier and at least two layers of catalyst containing alumina or zirconia, the catalysts in the catalyst containing alumina or zirconia layers being different from each other.

Japanese Patent Publication No. 105240/1982 discloses a catalyst for purifying exhaust gases containing at least two kinds of platinum-group metals. The catalyst comprises at least two carrier layers of a refractory metal oxide each containing a different platinum-group metal. There is a layer of a refractory metal oxide free from the platinum-group metal between the carrier layers and/or on the outside of these carrier layers.

Japanese Patent Publication No. 52530/1984 discloses a catalyst having a first porous carrier layer composed of an inorganic substrate and a heat-resistant noble metal-type catalyst deposited on the surface of the substrate and a second heat-resistant non-porous granular carrier layer having deposited thereon a noble metal-type catalyst, said second carrier layer being formed on the surface of the first carrier layer and having resistance to the catalyst poison.

Japanese Patent Publication No. 127649/1984 discloses a catalyst for purifying exhaust gases, comprising an inorganic carrier substrate such as cordierite, an alumina layer formed on the surface of the substrate and having deposited thereon at least one rare earth metal such as lanthanum and cerium and at least one of platinum and palladium, and a second layer formed on the aforesaid first alumina-based layer and having deposited thereon a base metal such as iron or nickel, and at least one rare earth metal such as lanthanum, and rhodium.

Japanese Patent Publication No. 19036/1985 discloses a catalyst for purifying exhaust gases having an enhanced ability to remove carbon monoxide at low temperatures, said catalyst comprising a substrate composed, for example, of cordierite and two layers of active alumina laminated to the surface of the substrate, the lower alumina layer containing platinum or vanadium deposited thereon, and the upper alumina layer containing rhodium and platinum, or rhodium and palladium, deposited thereon.

Japanese Patent Publication No. 31828/1985 discloses a catalyst for purifying exhaust gases, comprising a honeycomb carrier and a noble metal having a catalytic action for purifying exhaust gases, the carrier being covered with an inside and an outside alumina layer, the inside layer having more noble metal adsorbed thereon than the outside layer; and a process for production of this catalyst.

Japanese Patent Publication No. 232253/1985 discloses a monolithic catalyst for purifying exhaust gases being in the shape of a pillar and comprising a number of cells disposed from an exhaust gas inlet side toward an exhaust gas outlet side. An alumina layer is formed on the inner wall surface of each of the cells, and catalyst ingredients are deposited on the alumina layer. The alumina layer consists of a first alumina layer on the inside and a second alumina layer on the surface side, the first alumina layer having palladium and neodymium deposited thereon, and the second alumina layer having platinum and rhodium deposited thereon.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

U.S. Pat. No. 4,806,519, discloses a two layer catalyst structure having alumina, ceria and platinum on the inner layer and aluminum, zirconium and rhodium on the outer layer.

JP-88-240947 discloses a catalyst composite which includes an alumina layer containing ceria, ceria-doped alumina and at least one component selected from the group of platinum, palladium and rhodium. There is a second layer containing lanthanum-doped alumina, praseodymium-stabilized zirconium, and lanthanum oxide and at least one component selected from the group of palladium and rhodium. The two layers are placed on a catalyst carrier separately to form a catalyst for exhaust gas purification.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

Japanese Patent J-63-007895-A discloses an exhaust gas catalyst comprising two catalytic components, one comprising platinum dispersed on a refractory inorganic oxide support and a second comprising palladium and rhodium dispersed on a refractory inorganic oxide support.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The nobel metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483, referred to above, discloses a catalyst composition suitable for three-way conversion of internal combustion engine, e.g., automobile gasoline engine, exhaust gases and includes a catalytic material disposed in two discrete coats on a carrier. The first coat includes a stabilized alumina support on which a first platinum catalytic component is dispersed. The first coat also includes bulk ceria, and may also include bulk iron oxide, a metal oxide (such as bulk nickel oxide) which is effective for the suppression of hydrogen sulfide emissions, and one or both of baria and zirconia dispersed throughout as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

U.S. Ser. No. 08/722,761, filed Sep. 27, 1996, herein incorporated by reference, discloses a stable oxygen storage component comprising a zirconium, rare earth composition comprising and requiring zirconium, cerium, neodymium and praseodymium components and the use of this zirconium, rare earth composition in a catalyst composition, method of preparing the composition and the method of using the composition. The zirconium, rare earth composition of the comprises ceria, praseodymium, neodymium, rare earth components and a zirconium component. The rare earth components and the zirconium component are preferably in the form of oxide components. The preferred composition comprises in weight percent from 40 to 80, and preferably 45 to 70, and most preferably 50 to 60 weight percent zirconia, 10 to 60, preferably 20 to 40, and most preferably 25 to 35 weight percent ceria, and 1 to 15, preferably 2 to 15 and more preferably 5 to 10 weight percent neodymia, and 1 to 15, preferably 2 to 15 and more preferably 5 to 10 weight percent praseodymia. There is preferably a minimum of 40 weight percent zirconia, and a maximum of 80 weight percent zirconia, a minimum of 10 percent ceria and a maximum of 60 percent ceria, a minimum of 2 percent neodymia and a maximum of 15 percent neodymia and a minimum of 2 percent praseodymia and a maximum of 15 percent praseodymia. The particle size of the composite varies from about 0.5 to about 20 micrometers with preferred particles being less than about 15 micrometers and more preferably less than 10 micrometers.

Close coupled catalysts are disclosed in WO 96/17671, herein incorporated by reference. The principal function of a close coupled catalyst, also referred to as "precat" and "warm-up" catalysts, is to reduce hydrocarbon emissions during cold start. Cold start is the period immediately after starting the engine from ambient conditions. The cold start period depends on the ambient temperature, the type of engine, the engine control system and engine operation. Typically, the cold start period is within the first two minutes after the start of an engine at ambient temperature, FTP Test 1975 characterize cold start as the first bag of the FTP driving cycle which lasts for the first 505 seconds after starting an engine from ambient temperature, typically at 26° C. This is accomplished by locating at least part of the total exhaust system catalyst closer to the engine than traditional "underfloor catalyst". The underfloor catalyst is typically located beneath the floor of the vehicle. The close coupled catalyst is located in the engine compartment, i.e., beneath the hood and adjacent to the exhaust manifold.

There are two possible strategies for implementing a close coupled catalyst. The close coupled catalyst can occupy the entire catalyst volume or be a small volume catalyst used in conjunction with an underfloor catalyst. The design option depends on the engine configuration, size and space available. Catalysts at the close coupled position are also exposed to high temperature exhaust gas immediately exiting the engine after the engine has warmed up. As a consequence, the close coupled catalyst must have high temperature stability to be durable enough for meeting stringent emission standards as disclosed in M. Bhasin, et al., "Novel Catalyst for Treating Exhaust Gases from Internal Combustion and Stationary Source Engines", SAE 93054, 1993.

It is a continuing goal to develop a three-way catalyst system which is inexpensive and stable. At the same time the system should have the ability to oxidize hydrocarbons and carbon monoxide while reducing nitrogen oxides to nitrogen.

SUMMARY OF THE INVENTION

As indicated in the Background of the Invention, gasoline engines typically release exhaust gas pollutants which include hydrocarbons, carbon monoxide and nitric oxides. Typical catalytic converters are located "under the floor" of the automobile. Such catalytic converters comprise catalyst compositions which act as "three-way catalysts" (TWC). The TWC catalysts oxidize carbon monoxide to carbon dioxide and hydrocarbons to water and carbon dioxide, and reduce nitric oxides to nitrogen gas and oxygen.

The present invention relates to a catalyst composition and a layered catalyst composite. The composition is useful as a TWC catalyst which has a low light-off temperature and is thermally stable up to 1100° C. or more. The relative layers of the catalyst composite and the specific composition of such layers provide a stable, economical system.

The catalyst composition comprises at least two supports and at least one first precious metal component. There is at least one lanthana stabilized alumina support, and at least one refractory oxide support which is not stabilized (unstabilized support). Preferably, the surface area of the lanthana stabilized alumina support (greater surface area support) is greater than the surface area of the unstabilized (lesser surface area support). For the purpose of the present invention the lanthana stabilized alumina has a greater surface area than the lesser surface area at least one refractory oxide support after aging at an elevated temperature in air. Useful conditions to illustrate the advantage of using the stabilized alumina support versus unstabilized support surface areas is to heat the supports for two hours at 1000° C. and compare their surface areas.

The composition further comprises at least one precious metal component located on the lanthana stabilized alumina support and the unstabilized support. There is an oxygen storage composition preferably comprising, 40 to 80 weight percent of a diluent component, 10 to 60 weight percent of a cerium component, 1 to 15, preferably 2 to 15 weight percent of a neodymium component, and 1 to 15, preferably 2 to 15 weight percent of a praseodymium component. The composition also comprises at least one alkaline earth metal stabilizer; and a zirconium component.

An alternative embodiment of the present invention relates to a layered catalyst composite comprising a first layer, preferably the inner layer and a second layer, preferably the outer layer. The first layer comprises a first layer composition which comprises at least one first layer lanthana stabilized alumina support, and at least one first layer refractory oxide support which is not stabilized (unstabilized support). The surface area of first layer lanthana stabilized alumina support (first layer greater surface area support) is preferably greater than the surface area of one first unstabilized support (first layer lesser surface area support) particularly after heat aging as recited above. The first layer composition further comprises at least one first layer precious metal component located on the first layer lanthana stabilized alumina support, and the first layer unstabilized support. Optionally and preferably, the first layer further comprises a first layer oxygen storage composition preferably comprising, 40 to 80 weight percent of a diluent component, 10 to 60 weight percent of a cerium component, 1 to 15 and preferably 2 to 15 weight percent of a neodymium component, and 1 to 15 and preferably 2 to 15 weight percent of a praseodymium component. Alternatively or additionally other oxygen storage compositions can be included in the first layer. The composition also preferably comprises at least one first layer alkaline earth metal stabilizer; a first layer zirconium component; an optionally at least one rare earth promoter.

The second layer comprises at least one second layer support which can optionally include the recited lanthana stabilized alumina support; a second layer precious metal component; an oxygen storage composition preferably comprising 40 to 80 weight percent of a diluent component, 10 to 60 weight percent of a cerium component, 1 to 15 and preferably 2 to 15 weight percent of a neodymium component, and 1 to 15 and preferably 2 to 15 weight percent of a praseodymium component; and a second layer zirconium component.

When using the preferred composite of the present invention, exhaust gas emissions comprising hydrocarbons, carbon monoxide and nitrogen oxides first encounter an outer (top), second layer. The second layer preferably comprises a rhodium component and preferably a platinum component. The rhodium component in the second layer is believed to catalyze the reduction of nitrogen oxides to nitrogen and the oxidation of hydrocarbons and carbon monoxide. A platinum component in the second layer is believed to promote the rhodium component, to increase catalytic activity of rhodium. The second layer preferably comprises a second layer oxygen storage composition of the type recited above comprising 40 to 80 weight percent of a diluent component, preferably a zirconia component, 10 to 60 weight percent of a cerium component, 1 to 15, preferably 2 to 15 weight percent of a neodymium component, and 1 to 15, preferably 2 to 15 weight percent of a praseodymium component. There can be additional second layer oxygen storage components in the second layer, preferably second layer ceria and/or ceria stabilized zirconia. The second layer can also comprise a second layer zirconium component such as zirconia.

Upon passing through the outer, second layer, the exhaust gas then contacts the inner (bottom) first layer. In the bottom layer, the first layer precious metal component preferably comprises a palladium component and the optional first platinum component which are believed to primarily enhance oxidation reactions. These reactions can be promoted by a first oxygen storage composition as recited above for use in the first layer. Additionally, the first layer can comprise first layer oxygen storage components such as: the oxygen storage component containing zirconia, ceria, neodymia and praseodymia as recited above; praseodymia components; and ceria group components, preferably cerium oxide which can be in a bulk first oxygen storage composition form as used in the top layer, or be an oxygen storage component in intimate contact with the first platinum group metal component. Such intimate contact can be achieved by solution impregnation of the oxygen storage component onto the platinum group metal component.

The stabilized alumina support is preferably a lanthana stabilized alumina. More preferably, it is a solid solution of lanthana and alumina. The lanthana stabilized alumina support comprises from 0.5 to 25, preferably 0.5 to 10, and more preferably 1 to 6 and most preferably from 1.5 to 5 weight percent lanthana. The lanthana stabilized alumina can also contain other rare earth components such as ceria and/or neodymia. The other rare earth components can be present in amounts up to about 5 weight percent and typically from about 1.5 to about 3.5 weight percent. There are corresponding amounts of alumina, e.g., 99.5 to 75, 99.5 to 90, 99 to 94 and 98 to 95 weight percent alumina. Useful and preferred lanthana stabilized alumina compounds are commercially available from Grace Thermal & Emission Control Systems, Mobile Emission Products, W. R. Grace & Co.-Conn., P.O. Box 2075, Baltimore, Md. 21203. Preferred compounds are MI-480 indicated to have 2 to 2.5 weight percent lanthanum, 2.3 to 3.0 weight percent of other rare earths materials (believed to comprise ceria), up to 5.0 weight percent total volatiles, 0.1 weight percent $Na_2O$, 0.23 weight percent $Fe_2O_3$, 0.5 weight percent $SO_4$, and a minimum of 90 weight percent alumina. MI-480 is disclosed to have a fresh (unaged) surface area of about 92 $m^2/g$, upon being heated for two hours at a temperatures up to 1000° C. a surface area of about 85 $m^2/g$, upon being heated for two hours at a temperatures up to 1100° C. a surface area of about 80 $m^2/g$, and upon being heated for two hours at a temperatures up to 1200° C. a surface area of about 68 $m^2/g$. A similar and useful alternative grade of lanthana stabilized alumina is W. R. Grace grade MI-486 which contains 4 weight percent lanthana.

A variety of components can be added to the layers of the composite. A preferred precious metal component is selected from platinum group components such as palladium, platinum, rhodium and iridium components with palladium most preferred. A stable oxygen storage composition is included and comprises 40 to 80 weight percent of a diluent component, 10 to 60 weight percent of a cerium component, 1 to 15, preferably 2 to 15 weight percent of a neodymium component, and 1 to 15, preferably 2 to 15 weight percent of a praseodymium component. Preferably, the first layer also comprises at least one first layer stabilizer, preferably a first layer alkaline earth metal component; and preferably a first layer zirconium compound. The second layer comprises at least one second layer support, a second layer precious metal component, and preferably a second layer zirconium component.

The present catalyst composition and related composite, with its thermal stability and low light-off temperatures, are particularly useful to treat motor vehicle engine exhaust gas. Preferably, the catalyst composite is useful in the close coupled position. The close-coupled catalyst of the present invention has been designed to reduce hydrocarbon emissions from gasoline engines during cold starts.

The close-coupled catalyst is placed close to an engine to enable it to reach reaction temperatures as soon as possible. However, during steady state operation of the engine, the proximity of the close-coupled catalyst to the engine, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine.

The close-coupled catalyst present invention accomplishes the oxidation of carbon monoxide and hydrocarbons and reduction of nitrogen oxides at low reaction temperatures such as encountered during "cold start" conditions as reviewed in the Background. Such conditions are as low as 350° C., preferably 300° C. and more preferably as low as 200° C. The light-off temperature for a specific component is the temperature at which 50% of that component reacts. This is indicated by the light-off temperature of the close coupled catalyst. Preferably, the light-off temperatures of the composition of the present invention, and the composite, is as low as possible with useful catalysts having light-off temperatures in the range of 200° C. to 400° C., preferably 200° C. to 350° C., and more preferably 200° C. to 300° C. depending on the component being treated. The close-coupled catalyst composition should be thermally stable upon exposure to temperature up to 1100° C. and higher during the operating life of the engine. This has been accomplished by increasing thermal stability of the catalyst washcoat, and by controlling the reaction of carbon monoxide in the close-coupled catalyst bed and therefore reducing temperature rise related to carbon monoxide combustion in the catalyst bed. At the same time, the close-coupled catalyst compositions provides a relatively high hydrocarbon conversion. Optionally and preferably there can be a catalyst downstream of the close-coupled catalyst. The downstream catalyst can be an underfloor catalyst or a downstream catalyst immediately downstream of the close coupled catalyst. The downstream catalyst can be a supported catalyst composition adjacent to the close coupled catalyst on the same substrate or on a separate adjacent substrate.

Following are oxygen storage compositions which can be used in the first layer with preferred compositions recited above, and which can be used as additional oxygen compositions in the second layer. Such useful oxygen storage composition comprise a diluent in addition to the oxygen storage component. Useful and preferred diluents include refractory oxides. A useful and preferred diluent comprises a zirconium component, preferably zirconia. Diluted is used to mean that the oxygen storage component is present in the oxygen storage composition in relatively minor amounts. The oxygen storage composition is a mixture which can be characterized as a composite which may or may not be a true solid solution. The oxygen storage component is diluted to minimize interaction of the oxygen storage component with the certain other materials such as rhodium component. Such interaction may reduce long term catalytic activity.

The compositions useful in the present invention can further comprise additional oxygen storage compositions preferably in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483, both hereby incorporated by reference.

The platinum group metal component support components useful in the composition of the present invention includes at least one stabilized refractory compound, which is most preferably lanthana stabilized alumina, and additionally at least one unstabilized refractory compound selected from the group consisting of silica, alumina and titania compounds. Preferred first and second supports which are not stabilized compounds can be activated compounds selected from the group consisting of alumina, silica, titania, silica-alumina, alumino-silicates, alumina-zirconia, alumina-chromia, and alumina-ceria. In the composite of the present invention at least one of the first and second layer, preferably the first layer comprises at least one stabilized refractory compound, which is most preferably lanthana stabilized alumina, and additionally at least one refractory compound selected from the group consisting of silica, alumina and titania compounds. The other layer, preferably the second layer comprises at least one of the recited unstabilized refractory oxide supports.

The at least one of the first or second layers can further comprise a nickel or iron component to suppress hydrogen sulfide. Preferably, the first layer further comprises a nickel or iron component.

Stabilizers can be in either the first or second layers, and are preferably in the first layer. Stabilizers can be selected from at least one alkaline earth metal component derived from a metal selected from the group consisting of magnesium, barium, calcium and strontium, preferably strontium and barium. Zirconium components in the first and/or second layers is preferred and acts as both a stabilizer and a promoter. Rare earth oxides act to promote the catalytic activity of the first layer composition. Rare earth metal components are preferably selected from the group consisting of lanthanum metal components and neodymium metal components.

When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. Platinum group metal components are based on the weight of the platinum group metal.

A useful and preferred first layer of the present composite has:

from about 0.0175 to about 0.3 g/in$^3$ of a first layer palladium component;

from about 0 to about 0.065 g/in$^3$ of a first layer platinum group component other than palladium;

from about 0.15 to about 2.0 g/in$^3$ of the first layer lanthana stabilized alumina support;

from about 0.15 to about 2.0 g/in$^3$ of the first layer unstabilized alumina support;

from about 0.025 to about 0.5 g/in$^3$ of at least one first layer alkaline earth metal components;

from about 0.025 to about 0.5 g/in$^3$ of the first layer oxygen storage component; and from about 0.025 to about 1.0 g/in$^3$ of the at least one first layer zirconium component.

A useful and preferred second layer comprises;

from about 0.001 g/in$^3$ to about 0.03 g/in$^3$ of a second layer rhodium component;

from about 0 to about 0.065 g/in$^3$ of a second layer platinum group component other than rhodium;

from about 0.15 g/in$^3$ to about 2.0 g/in$^3$ of the second layer support;

from about 0.025 g/in$^3$ to about 1.0 g/in$^3$ of at least one second layer oxygen storage component; and from about 0.025 to about 0.5 g/in$^3$ of the second layer zirconium component.

Optionally, either the first and/or second layer further comprises from about 0.025 g/in$^3$ to about 0.5 g/in$^3$ of a nickel component.

The composite can be in the form of a self-supported article such as a pellet with the first layer on the inside and the second layer on the outside of the pellet. Alternatively, and more preferably, the first layer can be supported on a substrate, preferably a honeycomb carrier, and the second layer is supported on the first layer applied on the substrate.

The present invention includes a method comprising the steps of treating a gas comprising nitrogen oxide, carbon monoxide and/or hydrocarbon by contacting the gas with a layered catalyst composite as recited above.

The present invention also includes a method of preparation of the layered catalyst composite of the present invention.

BRIEF DESCRIPTION OF THE DRAWINGS

FIG. 2 is a schematic drawing showing a close-coupled catalyst used in combination with an underfloor catalyst.

FIG. 3 is an alternate embodiment of the present invention wherein the close-coupled catalyst is combined in a single housing with a second three-way catalyst which comprises an oxygen storage component such as ceria.

FIG. 4 is an alternate embodiment of the present invention wherein the close-coupled catalyst is used in combination with and spaced apart from the downstream catalyst.

FIG. 6 is a plot of hydrocarbon conversion (%) versus time (seconds) illustrating the results of Example 2.

DETAILED DESCRIPTION OF THE PREFERRED EMBODIMENTS

Figure 1:
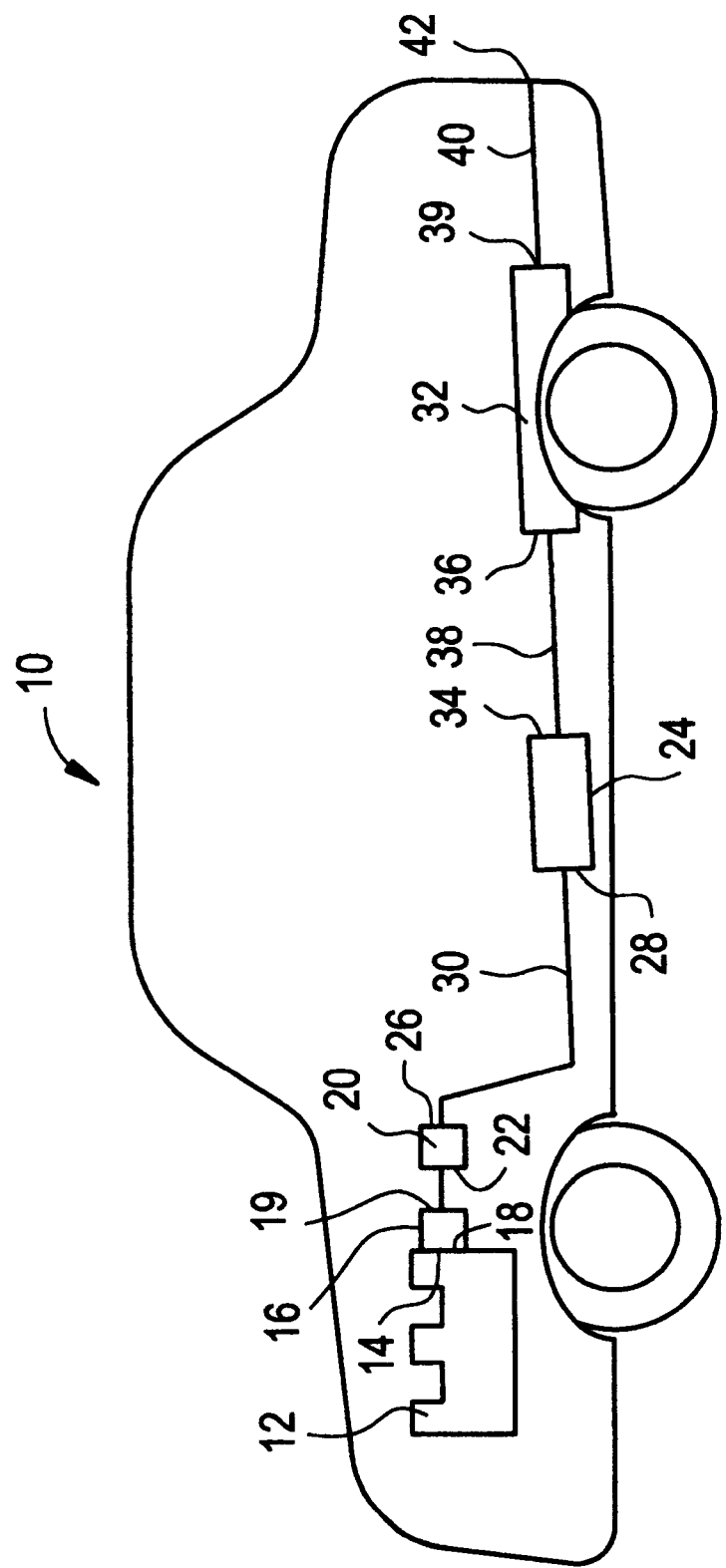
FIG. 1 is a schematic drawing of an automobile showing a preferred embodiment of the present invention.

The present invention is directed to a catalyst composition and a layered catalyst composite of the type useful as a three-way conversion catalyst or a TWC. The catalyst composition and composite of the present invention simultaneously catalyzes the oxidation of hydrocarbons and carbon monoxide and the reduction of nitrogen oxides present in a gas stream. The composition and composite are particularly useful as a close coupled catalyst in motor vehicle applications.

The present invention is also directed to a method of using the catalyst composition and a method of preparation of the catalyst composition. The present invention also includes a pellet, a supported layer or a composite of a plurality of layers including the catalyst composition. The layer or composite can be supported on a suitable substrate such as a monolithic catalyst honeycomb.

The catalyst composition comprises at least two supports, and at least one first precious metal component. There is at least one lanthana stabilized alumina support, and at least one refractory oxide support which is not stabilized (unstabilized support) Preferably, the surface area of the lanthana stabilized alumina support (greater surface area support) is greater than the surface area of the refractory oxide support (lesser surface area support). The stabilized support retains its original surface to a greater degree than the unstabilized support upon being heated for a period of at least two hours at temperature of 1000° C., or an equivalent period and temperature to achieve a substantially similar heat aging. It has also been observed that when a common support such as alumina is used, after heat aging at the same temperature, e.g., 500° C. to 1000° C. the stabilized alumina maintains a greater surface area than the unstabilized alumina, even when the unstabilized alumina has an initial surface area which is greater than that of the stabilized alumina. Additionally, it has been found that the composition further comprises at least one precious metal component located on the lanthana stabilized alumina support and the unstabilized support. There is an oxygen storage composition comprising, 40 to 80 weight percent of a diluent component, 10 to 60 weight percent of a cerium component, 1 to 15, preferably 2 to 15 weight percent of a neodymium component, and 1 to 15, preferably 2 to 15 weight percent of a praseodymium component as disclosed in U.S. Ser. No. 08/722,761, filed Sep. 27, 1996 herein incorporated by reference. The composition also comprises at least one alkaline earth metal stabilizer; and a zirconium component.

An alternative embodiment of the present invention relates to a layered catalyst composite comprising a first layer, preferably the inner layer and a second layer, preferably the outer layer. The first layer comprises a first layer composition which comprises at least one first layer lanthana stabilized alumina support, and at least one first layer refractory oxide support which is not stabilized (unstabilized). Preferably, the surface area of thermally aged first layer lanthana stabilized alumina support (first layer greater surface area support) is greater than the surface area of the thermally aged first layer unstabilized support (first layer lesser surface area support). The first layer composition further comprises at least one first layer precious metal component located on the first layer lanthana stabilized alumina support, and the first layer unstabilized support; and a first oxygen storage composition. Optionally and preferably, the first layer further comprises a first layer oxygen storage composition preferably comprising, 40 to 80 weight percent of a diluent component, 10 to 60 weight percent of a cerium component, 1 to 15 and preferably 2 to 15 weight percent of a neodymium component, and 1 to 15 and preferably 2 to 15 weight percent of a praseodymium component as disclosed in U.S. Ser. No. 08/722,761, filed Sep. 27, 1996 herein incorporated by reference. Alternatively or additionally other oxygen storage compositions can be included in the first layer. The composition also preferably comprises at least one first layer alkaline earth metal stabilizer; optionally at least one rare earth metal component as a promoter; and a first layer zirconium component.

The second layer comprises at least one second layer support which can optionally include the recited lanthana stabilized alumina support; a second layer precious metal component; an oxygen storage composition preferably comprising 40 to 80 weight percent of a diluent component, 10 to 60 weight percent of a cerium component, 1 to 15 and preferably 2 to 15 weight percent of a neodymium component, and 1 to 15 and preferably 2 to 15 weight percent of a praseodymium component; and a second layer zirconium component.

In preferred embodiments of the composition or the first layer composition of the composite the surface area of the lanthana stabilized alumina support, is greater than the surface area of the unstabilized support after aging for the equivalent of at least two hours at 1000° C. Surface area of the particulate supports is measured by any suitable procedure. A useful procedure is ASTM-D3663-78, also referred to as BET surface area expressed in meters square per gram ($m^2/g$). Briefly, the procedure is the determination of surface area using an automated nitrogen adsorption apparatus. Useful apparatus include the Quantachrome Autosorb-6 or the Micrometrics ASAP2400. The surface area is determined by measuring the volume of nitrogen gas adsorbed by the sample at several pressure levels. The BET (1) equation in its linear form is then used to determine the volume of adsorbed gas equivalent to a monomolecular layer. This is done by fitting a straight line to three relative pressure points (0.08, 0.014 and 0.20) on the linear portion of the isotherm, and determining the slope and intercept corresponding to the line of least squares. From the slope and the effective cross-sectional area of a single $N_2$ molecule (0.162 $nm^2$), the surface area of the sample is calculated.

In specific and preferred embodiments the composition of the present invention, including the composition of the first layer of the composite, comprises, after thermal aging, a greater surface area lanthana stabilized alumina support which has a greater surface area than a lesser surface area unstabilized support. Such thermal aging can be encountered during the calcining step of manufacture or upon use of the catalyst to treat heated exhaust gas streams. In preferred embodiments the initial or fresh surface area of the at least one lanthana stabilized alumina support is in the range of about 70–200 $m^2/g$, and the initial or fresh surface area of the at least one unstabilized support is in the range of about 10–350 $m^2/g$ with the proviso that at least one lanthana stabilized alumina support has a greater surface area than at least one unstabilized support after heat aging. Typically, prior to heat aging the lanthana stabilized alumina support is from about greater 75 $m^2/g$ to about 150 $m^2/g$ and the unstabilized support is from about 100 $m^2/g$ up to about 300 $m^2/g$. The recited surface areas are "initial" surfaces of the supports used to make the present compositions. Upon exposure to heating during processing and use, the surface area is expected to decrease. The surface area of stabilized support generally decreases to from about 65 $m^2/g$ to about 90 $m^2/g$, and the unstabilized alumina support generally decrease to about 20 $m^2/g$ to about 50 $m^2/g$. When heated together or under the same conditions the surface area of the stabilized support, such lanthana stabilized alumina, will generally be greater than the unstabilized support, such as unstabilized alumina, even when stabilizers are added to the catalyst composition as separate components. The higher surface area stabilized support has advantages. For example, it will require less precious metal catalyst than the same unstabilized support to achieve equivalent catalytic activity, particularly when using a precious metal such as palladium which is used in relatively large amounts, typically in the range of 25 $g/ft^3$ to 300 $g/ft^3$.

In accordance with a specific and preferred embodiment of the present invention the average particle size of the at least one lanthana stabilized alumina support first support can be the same as the average particle size of the at least one unstabilized support. The first precious metal can be supported on the both the lanthana stabilized alumina support and the unstabilized support. Typically, the particles of the two supports have at least 80% of the particles have an average diameter of less than 10 micrometers. Nominally, particles of precious metal and other components supported on a support are considered to be included with particle size measurement of the support.

Useful unstabilized supports include one or more refractory oxides. These oxides include, for example, alumina, titania, silica and zirconia include mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 m²/g to 350 m²/g.

The relative amounts of the stabilized and unstabilized supports can vary. Factors to consider are composition or composite stability, light-off and cost. Useful amounts of stabilized support in weight percents based on the sum or the stabilized supports and the unstabilized support present range from: 5% to 95%, preferably 10% to 50%; more preferably 15% to 40%, and most preferably 20% to 40% of the stabilized support with the balanced being unstabilized support.

Precious metals useful in the composition and composite of the present invention are preferably selected from platinum group components such as palladium, platinum, rhodium and iridium components.

Preferably, the composite of the present invention comprises at least one of the first layer precious metal component. The first layer precious metals are selected from platinum group components such as palladium, platinum, rhodium and iridium components. Preferably the first layer comprises at least one precious metal not present in the second layer. In a most preferred embodiment, at least one of the first layer precious metal component comprises a palladium component in the absence of significant amounts of rhodium and preferably in the absence of any rhodium. Optionally, the first layer can includes at least one additional first layer precious metal component such as platinum. A catalytically effective amount of a palladium and/or platinum, palladium component, preferably palladium is typically 5 g/ft³ to 300 g/ft³ and more typically 15 g/ft³ to 200 g/ft³ and preferably 25 g/ft³ to 150 g/ft³ of a palladium component.

The supported second layer precious metal preferably comprises a second layer rhodium component and optionally and preferably a second platinum component. The amount of rhodium component on the second support is from about 0.1 to 20, preferably from about 0.5 to 15 g/ft³. The supported second precious metal preferably contains from 50 to 100 weight percent of the rhodium component based on the total rhodium metal in the second layer support. Platinum can be used at from 0 to 100 g/ft³, and typically at least 0.1 g/ft³ and more typically 0.5 to 5.0 and more preferably from 5 to 75 g/ft³ by weight of platinum component.

The preferred catalyst of this invention comprises precious metals preferably platinum group metal components present in an amount sufficient to provide compositions having significantly enhanced catalytic activity to oxidize hydrocarbons and carbon monoxide and reduce nitrogen oxides.

In preparing the catalyst, a precious metal component such as a platinum group metal catalytic component can be a suitable compound, and/or complex of any of the platinum group metals may be utilized to achieve dispersion of the catalytic component on the above recited support particles. As used herein, the term "precious metal components" include gold, silver and "platinum group metal component" including the recited platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, rhodium chloride, rhodium nitrate, hexamine rhodium chloride, palladium nitrate or palladium chloride, etc. During a calcination step, or at least during the initial phase of use of the catalyst, such compounds are converted into a catalytically active form of the platinum group metal or a compound thereof, typically an oxide.

The preferred oxygen storage component useful in the present invention is described in U.S. Ser. No. 08/722,761, filed Sep. 27, 1996 herein incorporated by reference, and which comprises ceria, praseodymium, neodymium, rare earth components and a zirconium component. The rare earth components and the zirconium component are preferably in the form of oxide components. The preferred composition comprises in weight percent from 40 to 80, and preferably 45 to 70, and most preferably 50 to 60 weight percent zirconia, 10 to 60, preferably 20 to 40, and most preferably 25 to 35 weight percent ceria, and 1 to 15, preferably 2 to 15 and more preferably 5 to 10 weight percent neodymia, and 1 to 15, preferably 2 to 15 and more preferably 5 to 10 weight percent praseodymia. There is preferably a minimum of 40 weight percent zirconia, and a maximum of 80 weight percent zirconia, a minimum of 10 percent ceria and a maximum of 60 percent ceria, a minimum of 2 percent neodymia and a maximum of 15 percent neodymia and a minimum of 2 percent praseodymia and a maximum of 15 percent praseodymia.

The zirconium, rare earth composition preferably comprises by weight ratios based on ceria to zirconia of from 1:1 to 1:3, a weight ratio of ceria to praseodymia of from 5:1 to 1:1 and a weight ratio of ceria to neodymia of from 5:1 to 1:1. Preferred compositions comprise at least 50 weight percent zirconia in which is incorporated the rare earth compounds and precipitated to form an oxide composite.

The particle size of the composite varies from about 0.1 to about 20 micrometers with preferred particles being less than about 15 micrometers and preferably less than about 10 micrometers.

The present composition, or the second layer composition can contain oxygen storage compositions in addition to the oxygen storage component containing zirconia, ceria, neodymia and praseodymia as recited above. As indicated the first layer composition can optionally contain the oxygen storage component containing zirconia, ceria, neodymia and praseodymia as recited above or other oxygen storage compositions. Such additional or other oxygen storage components can be in any form, including bulk form, or impregnated as a solution where there can be intimate contact between the oxygen storage component and the platinum group metal components. Intimate contact occurs when the oxygen storage component is introduced in the form of a solution of a soluble salt which impregnates the support and other particulate material and then can be converted to an oxide form upon calcining. The oxygen storage component is any such material known in the art and preferably at least one oxide of a metal selected from the group consisting of rare earth metals, most preferably a cerium or praseodymium compound with the most preferred oxygen storage component being cerium oxide (ceria). A useful oxygen storage composition is a bulk composite comprising ceria and zirconia. This results in the oxygen storage component having minimum intimate contact with the platinum group metal components (i.e., the rhodium and palladium components) even where the platinum group metal components are supported on the bulk oxygen storage composition particles.

The oxygen storage component can be included by dispersing methods known in the art. Such methods can include impregnation onto the first or second composition. The oxygen storage component can be in the form of an aqueous solution. Drying and calcining the resulted mixture in air results in an oxide of the oxygen storage component in intimate contact with the platinum group metal component. Typically, impregnation means that there is substantially sufficient liquid to fill the pores of the material being impregnated. Examples of water soluble, decomposable oxygen storage components which can be used include, but are not limited to, cerium acetate, praseodymium acetate, cerium nitrate, praseodymium nitrate, etc. U.S. Pat. No. 4,189,404 discloses the impregnation of alumina based support composition with cerium nitrate.

Alternatively, the oxygen storage composition can be included in the composition in bulk form. The bulk oxygen storage composition can comprise an oxygen storage component which is preferably a cerium group component preferably ceria or praseodymia, and most preferably ceria. By bulk form it is meant that the composition comprising ceria and/or praseodymia is present as discrete particles which may be as small as 0.1 to 15 microns in diameter or lesser, as opposed to having been dispersed in solution as cited above. A description and the use of such bulk components is presented in U.S. Pat. No. 4,714,694, hereby incorporated by reference. As noted in U.S. Pat. No. 4,727,052, also incorporated by reference, bulk form includes oxygen storage composition particles of ceria admixed with particles of zirconia, or zirconia activated alumina. It is particularly preferred to dilute the oxygen storage component as part of an oxygen storage component composition.

The oxygen storage component composition can comprise an oxygen storage component, preferably ceria and a diluent component. The diluent component can be any suitable filler which is inert to interaction with platinum group metal components so as not to adversely affect the catalytic activity of such components. A useful diluent material is a refractory oxide with preferred refractory oxides being of the same type of materials recited below for use as catalyst supports. Most preferred is a zirconium compound with zirconia most preferred. Therefore, a preferred oxygen storage component is a ceria-zirconia composite. There can be from 1 to 99, preferably 1 to 50, more preferably 5 to 30 and most preferably 10 to 25 weight percent ceria based on the ceria and zirconia. Another preferred oxygen storage composition can comprise a composite comprising zirconia, ceria and at least one rare earth oxide. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides. In the composition, the amount of thermal stabilizer may be from about 0.05 to 30 weight percent, preferably from about 0.1 to 10 weight percent.

The composition can contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The compositions can optionally contain at least one first layer and/or second layer promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia. While these compounds are disclosed to act as stabilizers, they can also act as reaction promoters. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The lanthanum and/or neodymium are in the form of their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

The composition of the present invention can contain other conventional additives such as sulfide suppressants, e.g., nickel or iron components. If nickel oxide is used, an amount from about 1 to 25% by weight of the first coat can be effective, as disclosed in commonly owned Ser. No. 07/787,192, herein incorporated by reference.

A particularly useful catalyst composition of the present invention comprises from about 0.0175 to about 0.3 $g/in^3$ of a palladium component; from about 0 to about 0.065 $g/in^3$ of a platinum group component other than palladium; from about 0.15 to about 2.0 $g/in^3$ of a lanthana stabilized alumina support; from about 0.15 to about 2.0 $g/in^3$ of an unstabilized alumina support; from about 0.025 to about 0.5 $g/in^3$ of at least one alkaline earth metal components; from about 0.025 to about 0.5 $g/in^3$ of a zirconium component; from about 0.025 to about 0.5 $g/in^3$ of the at least one oxygen storage component; and from about 0.0 to about 0.5 $g/in^3$ of at least one rare earth metal component selected from the group consisting of lanthanum metal components and neodymium metal components. Optionally, the composition can further comprise from about 0.025 g/in$^3$ to about 0.5 g/in$^3$ of a nickel component. The particulate composite of zirconia and ceria can comprise 50 to 90 wt. % zirconia, 10 to 40 wt. % ceria and from 0 to 10 wt % rare earth oxides comprising lanthana, neodymia and mixtures thereof.

A useful and preferred composite comprises a first layer of the present composite has:

from about 0.0175 to about 0.3 g/in$^3$ of a first layer palladium component;

from about 0 to about 0.065 g/in$^3$ of a first layer platinum group component other than palladium;

from about 0.15 to about 2.0 g/in$^3$ of the first layer lanthana stabilized alumina support;

from about 0.15 to about 2.0 g/in$^3$ of the first layer alumina support;

from about 0.025 to about 0.5 g/in$^3$ of at least one first layer alkaline earth metal components;

from about 0.025 to about 1.0 g/in$^3$ of the first layer oxygen storage component; and from about 0.025 to about 0.5 g/in$^3$ of the at least one first layer zirconium component.

A useful and preferred second layer comprises;

from about 0.001 g/in$^3$ to about 0.03 g/in$^3$ of a second layer rhodium component;

from about 0 to about 0.065 g/in$^3$ of a second layer platinum group component other than rhodium;

from about 0.15 g/in$^3$ to about 2.0 g/in$^3$ of the second layer support;

from about 0.025 g/in$^3$ to about 1.0 g/in$^3$ of at least one second layer first oxygen storage component; and from about 0.025 to about 0.5 g/in$^3$ of the second layer zirconium component.

Optionally, either the first and/or second layer further comprises from about 0.025 g/in$^3$ to about 0.5 g/in$^3$ of a nickel component.

The catalyst composition can be coated as a layer on a monolithic substrate generally which can comprise from about 0.50 to about 6.0, preferably about 1.0 to about 5.0 g/in$^3$ of catalytic composition based on grams of composition per volume of the monolith.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at quite elevated temperatures, e.g., at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 600 or more flow channels ("cells") per square inch of cross section, although far fewer may be used. For example, the carrier may have from about 60 to 600, more usually from about 200 to 400, cells per square inch ("cpsi").

The catalyst composition and composite of the present invention can be made by any suitable method. A preferred method comprises mixing a first mixture of a solution of at least one water-soluble, first precious metal component such as palladium component and optionally a first platinum component, and finely-divided, high surface area, refractory oxide as recited above which is sufficiently dry to absorb essentially all of the solution.

The first precious metal components are added to water to form a first slurry and preferably comminuted in the first slurry. Preferably, the slurry is acidic, having a pH of less than 7 and preferably from 3 to 7. The pH is preferably lowered by the addition of an acid, preferably acetic acid to the slurry. In particularly preferred embodiments the first slurry is comminuted to result in substantially all of the solids having particle sizes of less than 10 micrometers in average diameter. The first slurry can be formed into a first layer and dried. The first palladium component and optional platinum component in the resulting first mixture in the first layer can be converted to a water insoluble form. They can be converted to insoluble form chemically or by calcining. The first layer is preferably calcined, preferably at least 400° C.

A second mixture of a solution of at least one water-soluble second precious metal component, such as rhodium component and optionally at least one additional water-soluble precious metal component such as a platinum component, and finely-divided, high surface area, refractory oxide, as recited above, which is sufficiently dried to absorb essentially all of the solution is mixed. The second precious metal components can be added to water to form a second slurry and preferably comminuted in the second slurry. Preferably, the second slurry is acidic, having a pH of less than 7 and preferably from 3 to 7. The pH is preferably lowered by the addition of an acid, preferably acidic acid to the slurry. In particularly preferred embodiments the second slurry is comminuted to result in substantially all of the solids having particle sizes of less than 10 micrometers in average diameter. The second slurry can be formed into a second layer on the first layer and dried. The second precious metal components in the resulting second mixture are converted to a water insoluble form. The precious metal components can be converted to insoluble form chemically or by calcining. The second layer is preferably then calcined, preferably at least 400° C.

Each layer of the present composite can also be prepared by the method in disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. During the latter conversion or fixing of the catalytically-promoting metal component on the support, the composite remains essentially dry, i.e., it has substantially no separate or free liquid phase.

The mixture containing the fixed, catalytically-promoting metal component can be comminuted as a slurry which is preferably acidic, to provide solid particles that are advantageously primarily of a size of up to about 5 to 15 microns. The resulting slurry is preferably used to coat a macro size carrier, preferably having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions. Each of the first and second layers can be succeedingly applied and calcined to form the composite of the present invention.

The method provides compositions of uniform and certain catalytically-promoting metal content since essentially all of the platinum group metal component thereby added to the preparation system remain in the catalyst, and the compositions contain essentially the calculated amount of the single or plural active catalytically-promoting metal components. In some instances a plurality of catalytically-active metal components may be deposited simultaneously or sequentially on a given refractory oxide support. The intimate mixing of separately prepared catalytically-promoting metal component refractory oxide composites of different composition made by the procedure of this invention, enables the manufacture of a variety of catalyst whose metal content may be closely controlled and selected for particular catalytic effects. Such mixed composites may, if desired, contain one or more catalytically-promoting metal components on a portion of the refractory oxide support particles, and one or more different catalytically-promoting metal components on another portion of the refractory oxide support particles. For example, the composite may have a platinum group metal component on a portion of the refractory oxide particles, and a base metal component on a different portion of the refractory oxide particles. Alternatively, different platinum group metals or different base metals may be deposited on separate portions of the refractory oxide support particles in a given composite. It is, therefore, apparent that this process is highly advantageous in that it provides catalysts which can be readily varied and closely controlled in composition.

In order to deposit the catalytically-promoting group metal-support composite on the macrosized carrier, one or more comminuted slurries are combined separately or together with the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20 to 50 weight percent of finely-divided solids, preferably about 35 to 45 weight percent.

The comminuted catalytically-promoting metal component-high surface area support composite can be deposited on the carrier in a desired amount, for example, the composite may comprise about 2 to 30 weight percent of the coated carrier, and is preferably about 5 to 20 weight percent. The composite deposited on the carrier is generally formed as a coating over most, if not all, of the surfaces of the carrier contacted. The combined structure may be dried and calcined, preferably at a temperature of at least about 400° C., but not so high as to unduly destroy the high area of the refractory oxide support, unless such is desired in a given situation.

A preferred application of the present invention will be understood by those skilled in the art by reference to the accompanying FIGS. 1, 2, 3 and 4.

The present invention comprises a close-coupled catalyst comprising a close-coupled catalyst composition in close proximity to the exhaust outlet of a gasoline engine. The catalyst composition comprises the above recited supports, a precious metal component, a stabilized oxygen storage composition and preferably at least one alkaline metal oxide component, preferably strontium oxide, and preferably a zirconium component. The catalyst composition support of the present invention comprises at least one stabilized alumina support and at least one refractory oxide support. The stabilized oxygen storage composition preferably comprises a diluent, a cerium component, a neodymium component and a praseodymium component. Alternatively, the above recited composite can be used.

Reference is made to FIG. 1 which illustrates a particular and preferred embodiment of the present invention. FIG. 1 shows a motor vehicle 10 having a gasoline engine 12. The gasoline engine 12 has an engine exhaust outlet 14. In typical and preferred embodiments, the engine exhaust outlet 14 communicates to an engine exhaust manifold 16 through manifold inlet 18. A close-coupled catalyst is in close proximity to the engine exhaust manifold outlet 19. The manifold outlet 19 is connected and communicates with close-coupled catalyst 20 through close-coupled catalyst inlet 22. The close-coupled catalyst 20 is connected to and communicates with a downstream catalyst, such as underfloor catalytic converter 24. The close-coupled catalyst has a close-coupled catalyst outlet 26 which is connected to the underfloor catalyst 24 through the close-coupled catalyst exhaust pipe 30 to under floor catalyst inlet 28. The underfloor catalyst 24 is typically and preferably connected to muffler 32. In particular, the underfloor catalyst outlet 34 is connected to the muffler inlet 36 through underfloor exhaust pipe 38. The muffler has a muffler outlet 39 which is connected to tailpipe 40 having a tailpipe outlet 42 which opens to the environment. FIG. 2 shows a schematic drawing of the close-coupled catalyst 20 in combination with underfloor catalyst 24. In this preferred embodiment, the close-coupled catalyst comprises a close-coupled honeycomb support 44 on which is coated the close-coupled catalyst composition. The underfloor catalyst 24 comprises an underfloor honeycomb 46 on which is coated an underfloor catalyst composition. The close-coupled catalyst honeycomb of FIG. 2 is sealingly mounted in close-coupled canister 52 which has close-coupled catalyst inlet 22 and close-coupled catalyst outlet 26 connected by close-coupled catalyst exhaust pipe 30 to the inlet 28 of underfloor catalyst 24 which is sealingly mounted in underfloor catalyst canister 54. Underfloor exhaust pipe 38 is connected to underfloor catalyst outlet 34.

FIG. 3 illustrates an alternative embodiments of the close-coupled catalyst which comprises two adjacent honeycombs. In this embodiment, the close-coupled catalyst comprises a combined close-coupled honeycomb support 48 on which is coated the close-coupled catalyst composition. The downstream catalyst comprises a combined downstream catalyst support 50, on which is coated, preferably, a three-way combined downstream catalyst composition. The combined close-coupled catalyst 48 and combined downstream catalyst 50 can be adjacent to each other, preferably having corresponding honeycomb designs. Alternatively, as shown in FIG. 4, they can be spaced apart. Finally, there can be one or more plurality of combined close-coupled catalyst honeycomb 48 and one or more combined downstream catalyst honeycomb 50.

FIGS. 3 and 4 show a combined close-coupled catalyst honeycomb 48 and three-way catalyst 50 honeycomb sealingly mounted in combined canister 56. The combined canister 56 has a close-coupled catalyst inlet 22 into which exhaust gases from the engine flow and a combined catalyst outlet 58 which leads to combined exhaust pipe 60. Combined exhaust pipe 60 leads to the inlet 36 of muffler 32. In FIG. 3, honeycombs 48 and 50 are adjacent and butting, and have similar adjacent profiles. FIG. 4, honeycombs 48 and 50 are spaced apart by space 51 and can have different opposing profiles.

Preferably, the amount close-coupled catalyst is less than the downstream, i.e., underfloor, catalyst with the relative amount of close-coupled catalyst composition being from $1/20$ to $1/2$ of the total of the close-coupled and underfloor catalyst composition based on the weight per volume of catalyst (i.e., g/in$^3$). Alternatively, the close-coupled catalyst volume (volume of honeycomb) is from $1/20$ to $1/2$ of the total catalyst volume.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° C. to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or as other desired form having a greater or lesser oxygen concentration. The products from the oxidation contain a greater weight ratio of oxygen to carbon than in the feed material subjected to oxidation. Many such reaction systems are known in the art.

The present invention is illustrated further by the following examples which are not intended to limit the scope of this invention.

EXAMPLE 1

A. The First Layer

Lanthana stabilized alumina powder, sold as MI-480 by Grace Thermal & Emission Control Systems of W. R. Grace & Co. which is specified as having an initial surface area of 92 m$^2$/g, and a high surface area unstabilized alumina having and initial surface area of about 160 m$^2$/g were impregnated with an aqueous palladium nitrate solution. An oxygen storage composition as disclosed in U.S. Ser. No. 08/722, 761, filed Sep. 27, 1996 and comprising by weight percent 28 percent ceria (CeO$_2$), 7 percent praseodymia (Pr$_6$O$_{11}$), 7 percent neodymia (Nd O$_2$)$_3$ and 58 percent zirconia (ZrO$_2$); strontium nitrate; and zirconium acetate were combined with the supported palladium component and to form an aqueous slurry having 50 weight percent water. The slurry was ball milled with 2%, based on the weight of the support, of glacial acetic acid and sufficient water to form a 45 percent by weight solids aqueous slurry. The slurry was coated as a first layer onto a cylindrical monolith support. The monolith support of cordierite contained about 400 flow through passages per square inch of cross section and 4.5 inches long was dipped into the washcoat slurry. The monolith had a round cross section 3.66 inches in diameter. The passages were parallel to the length of the cylinder. The excess liquid was blown off of the monolith with compressed air. The resultant catalyzed monolith was dried at about 110° C. for about 2 hours and calcined at 550° C. for at least one hour. The resulting monolith contained 54.0 g/ft$^3$ palladium, 0.30 g/in$^3$ of lanthana stabilized alumina, 0.90 g/in$^3$ of unstabilized alumina, 0.10 g/in$^3$ of the oxygen storage composition, 0.01 g/in$^3$ ZrO$_2$, and 0.15 g/in$^3$ SrO. Stated another way, the first layer contained 20.12 wt. % of lanthana stabilized alumina, 60.35 wt. % of unstabilized alumina, 6.71 wt. % of the oxygen storage composition, 0.67 wt. % ZrO$_2$, 10.06 wt. % SrO, and 2.10 wt. % palladium (based on the metal). The first layer had a loading on the substrate of 1.491 g/in$^3$.

B. The Second Layer

A rhodium nitrate aqueous solution was impregnated onto a combination of two high surface area unstabilized aluminas, one having an initial surface area of about 160 m$^2$/g and the other having an initial surface area of about 90 m²/g. The same oxygen storage component was used as recited for use in the first layer, and a zirconium acetate solution. The composition was ball milled with 2%, based on the weight of the supports, of glacial acetic acid and sufficient water to form a 46 percent by weight solids, aqueous slurry to form a washcoat. This was diluted to 44 weight percent solids to form the second layer slurry. The monolith layered with the first layer in Part A of this Example was dipped in the second layer slurry. After blowing off the excess and drying at 110° C. for about 2 hours and calcining for at least one hour at 550° C., the second layer had 6.0 g/ft³ rhodium, 0.20 g/in³ of unstabilized alumina having a surface area of 160 g/in³, 0.20 g/in³ of unstabilized alumina having a surface area of 90 g/in³, 0.40 g/in³ of the oxygen storage composition, and 0.05 g/in³ $ZrO_2$. Stated another way, the second layer contained 23.434 wt. % of each unstabilized alumina, 46.867 wt. % of the oxygen storage composition, 5.858 wt. % $ZrO_2$, and 0.407 wt. % (based on the metal). The second layer had a loading on the substrate of 0.853 g/in³.

A catalyzed honeycomb monolith made according to a process similar to that described above was aged on an engine dynamometer system at 820° C. inlet temperature for 100 hours. The catalyzed honeycomb underwent cyclic aging with the ratio of oxygen and carbon monoxide cycling from rich to lean and vice versa.

The honeycomb monolith was then evaluated using a GM MY95 vehicle equipped with a 5.7 liter 8 cylinder engine. Secondary air injected at a volume of 3.5 m³/hour into the manifold for the first 80 seconds for the FTP75 Phase 1. Results illustrating exhaust gas hydrocarbon conversion versus time are shown as plot A on FIG. 5.

A comparative layered catalyst (Comparative 1) using only unstabilized support was also evaluated. The Comparative 1 layered catalyst was coated in two layers on to the same type of honeycomb substrate as described above. The first layer contained 71.58 wt. % of unstabilized alumina having an initial surface area of 160 m²/g, 4.60 wt. % of nickel oxide, 10.00 wt. % $CeO_2$, 5.75 wt. % $ZrO_2$, 6.00 wt. % SrO, and 2.083 wt. % palladium (based on the metal). The second layer contained 64.89 wt. % of ceria stabilized zirconia (having about 20 weight percent ceria and about 80 weight percent zirconia), 28.25 wt. % of unstabilized alumina having an initial surface area of 160 m²/g, 6.49 wt. % $ZrO_2$, and 0.366 wt. % rhodium (based on the metal). Results illustrating exhaust gas hydrocarbon conversion versus time are shown as plot B on FIG. 5.

EXAMPLE 2

A catalyzed honeycomb monolith containing two layers of the type described in Example 1 was placed in a catalytic converter downstream of an upstream catalyzed honeycomb. The upstream honeycomb contained one layers of catalyst coating. The single layer contained 64.88 wt. % of unstabilized alumina having an initial surface area of 160 m²/g, 10.02 wt. % of $La_2O_3$, 8.44 wt. % $Nd_2O_3$, 5.75 wt. % $ZrO_2$, 5.27 wt. % SrO, and 6.105 wt. % palladium (based on the metal). This type of catalyzed honeycomb and related methods of preparation is disclosed in WO 96/17671. The honeycomb had the same geometry as the honeycomb used in Example 1 except that the cylinder was 2.5 inches long. The converter was located about 16 inches downstream of the engine.

A catalyzed honeycomb monolith made according to a process similar to that described above was aged on an engine dynamometer system at 820° C. inlet temperature for 100 hours. The catalyzed honeycomb underwent cyclic aging.

The Example 2 honeycomb monolith located downstream of the upstream honeycomb was then evaluated using an FTP75 cycle using a GM MY95 vehicle equipped with a 5.7 liter 8 cylinder engine. Secondary air injected at a volume of 3.5 m³/hour into the manifold for the first 125 seconds for the FTP75 Phase 1. The fuel contained 140 parts per million sulphur. Results illustrating exhaust gas hydrocarbon conversion versus time are shown as plot C on FIG. 6. A comparative layered catalyst (Comparative 2) of the same type a as Comparative 1, using only unstabilized support, was placed in a catalytic converter downstream of the same type of upstream catalyzed honeycomb as recited for use with Example 2 was tested as Comparative 2. Results are shown as plot D on FIG. 6.

EXAMPLE 3

Catalyzed honeycombs containing compositions of the type described in Example 1 and Comparative 1 were made and aged at 1100° C. for 12 hours in 10% $H_2O$ containing forming gas comprising 7% (nominal) hydrogen and with the balance being nitrogen. These samples were three inch long cylindrical cores 1.5 inches in diameter. They were tested using a laboratory tube reactor, using synthetic gas. The synthetic gas used to evaluate sample performance comprised a flow of $CO_2$—15.0%, $CH_3H_6$—235 ppm, $CH_3H_8$—235 ppm, NO—1500 ppm, $SO_2$—45 ppm, $H_2O$—10% with the balance being $N_2$. There was a pertubation of $CO/H_2$ from 0.3% to 0.75% and $O_2$ from 0.3% to 0.60%. The "Light-Off Ramping Rate=10° C./minute.

The light-off temperatures at which there was 50% conversion for the Example 1 sample was 252° C. for gaseous hydrocarbons, 231° C. for carbon monoxide, and 220° C. for nitrogen oxides. The light-off temperatures at which there was 50% conversion for the Comparative 1 sample was 354° C. for gaseous hydrocarbons, 295° C. for carbon monoxide, and 298° C. for nitrogen oxides.

Conversion efficiency, percent of the target gases converted, at a gas inlet temperature of 490° C. to the honeycomb for the Example 1 sample was 100% for gaseous hydrocarbons, 84% for carbon monoxide, and 100% for nitrogen oxides. Conversion efficiency, percent of the target gases converted, at an gas inlet temperature of 490° C. to the honeycomb for the Comparative 1 sample was 86% for gaseous hydrocarbons, 93% for carbon monoxide, and 100% for nitrogen oxides.

The aging was continued in air with 10% water for an additional hours at 1100° C., and the Example and Comparative performance was equivalent. Conversion was also found to be equivalent in laboratory testing using actual exhaust gas after aging the samples for 50 hours at 820° C. under pertubating conditions with the gas going from lean to rich and vica versa.

Figure 5:
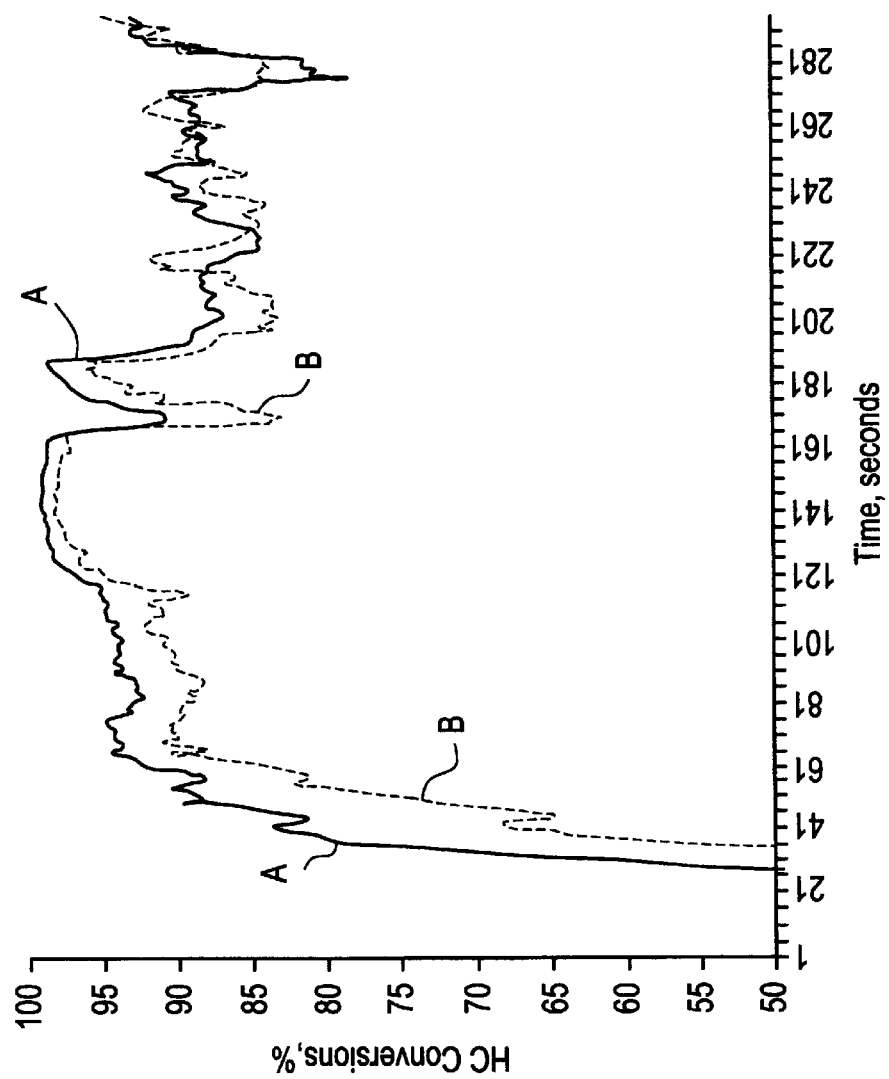
FIG. 5 is a plot of hydrocarbon conversion (%) versus time (seconds) illustrating the results of Example 1.

The laboratory testing conducted in Example 3 showed that under the initial aging conditions significantly improved light-off results were obtained with the Example 1 composite compared to Comparative 1. Upon more extreme aging (12 additional hours at 1100° C.) the light-off and conversion properties of the Example and Comparative composites were equivalent. However, the dramatic improvement in the light-off properties obtained during the first 12 hour aging testing in laboratory results shown in Example 3 warranted the 1975 FTP testing of Examples 1 and 2 to ascertain actual engine test results. This testing bore out the promise of the improved light-off performance shown in Example 3 as shown in FIGS. 5 and 6.

Modifications, changes and improvements to the preferred forms of the invention herein disclosed may occur to those skilled in the art. Accordingly, the scope of the patent to be issued hereon should not be limited to the particular embodiments of the invention set forth herein, but rather should be limited by the advance of which the invention has promoted the art.

What is claimed is:

1. A layered catalyst composite comprising a first layer and a second layer:

the first layer comprising:
   - at least one first layer lanthana stabilized alumina support comprising a solid solution comprising lanthana and alumina;
   - at least one first layer unstabilized refractory oxide support, wherein the refractory oxide is not in solid solution with a rare earth component;
   - at least one first layer precious metal component located on the lanthana stabilized alumina support and the unstabilized refractory oxide support;
   - a first layer oxygen storage composition;
   - at least one first layer stabilizer; and
   - a first layer zirconium compound; and the second layer comprising:
   - at least one second layer support;
   - a second layer oxygen storage composition is a composite which comprises,
     - 40 to 80 weight percent of a diluent component,
     - 10 to 60 weight percent of a cerium component,
     - 1 to 15 weight percent of a neodymium component, and
     - 1 to 15 weight percent of a praseodymium component;
   - a second layer precious metal component; and
   - a second layer zirconium component.

2. The layered catalyst composite as recited in claim 1 where first layer lanthana stabilized alumina support has a greater surface area than the first layer unstabilized refractory oxide supports upon aging at an elevated temperature.

3. The layered catalyst composite as recited in claim 1 wherein the first layer precious metal component comprises a first layer palladium component, and the second layer precious metal component comprises a second layer rhodium component.

4. The layered catalyst composite as recited in claim 1 wherein the first layer unstabilized refractory oxide support is a compound selected from the group consisting of silica, alumina, zirconia and titania compounds.

5. The layered catalyst composite as recited in claim 4 wherein the first layer unstabilized refractory oxide support comprises an activated compound selected from the group consisting of alumina, silica, silica-alumina, aluminosilicates, alumina-zirconia, alumina-chromia, and alumina-ceria.

6. The layered catalyst composite as recited in claim 5 wherein the first layer unstabilized refractory oxide support is activated alumina.

7. The layered catalyst composite as recited in claim 1 wherein at least one of the first layer and the second layer further comprises at least one oxygen storage composition which comprises an oxygen storage component selected from ceria, praseodymia and a ceria-zirconia composite.

8. The layered catalyst composite as recited in claim 7 wherein the first layer oxygen storage composition is a composite which comprises,
   - 40 to 80 weight percent of a diluent component,
   - 10 to 60 weight percent of a cerium component,
   - 1 to 15 weight percent of a neodymium component, and
   - 1 to 15 weight percent of a praseodymium component.

9. The layered catalyst composite as recited in claim 8 wherein at least one of the first layer and the second layer further comprises at least one oxygen storage composition which comprises an oxygen storage component selected from ceria, praseodymia and a ceria-zirconia composite.

10. The layered catalyst composite as recited in claim 1 wherein at least one second layer support comprises lanthana stabilized alumina.

11. The layered catalyst composite as recited in claim 1 wherein at least one of the first or second layers further comprises a nickel or iron component.

12. The layered catalyst composite as recited in claim 1 wherein the first layer stabilizer is at least one first layer alkaline earth metal component derived from a metal selected from the group consisting of magnesium, barium, calcium and strontium.

13. The layered catalyst composite as recited in claim 12 wherein the at least one first layer alkaline earth metal component is derived from a metal selected from the group consisting of strontium and barium.

14. The layered catalyst composite as recited in claim 13 wherein the second alkaline earth metal component is strontium oxide.

15. The layered catalyst composite as recited in claim 1 wherein the first layer further comprises at least one first rare earth metal component selected from the group consisting of lanthanum components and neodymium components.

16. The layered catalyst composite as recited in claim 1 wherein the composite is in the form of a pellet with the first layer on the inside and the second layer on the outside of the pellet.

17. The layered catalyst composite as recited in claim 1 wherein the first layer is supported on a substrate and the second layer is supported on the first layer opposite the substrate.

18. The layered catalyst composite as recited in claim 17 wherein the substrate comprises a honeycomb carrier.

19. The layered catalyst composite as recited in claim 1 wherein the first layer comprises:
   - from about 0.0175 to about 0.3 $g/in^3$ of a first layer palladium component;
   - from about 0 to about 0.065 $g/in^3$ of a first layer platinum group component other than palladium;
   - from about 0.15 to about 2.0 $g/in^3$ of the first layer lanthana stabilized alumina support;
   - from about 0.15 to about 2.0 $g/in^3$ of the first layer unstabilized alumina support;
   - from about 0.025 to about 0.5 $g/in^3$ of at least one first layer alkaline earth metal components;
   - from about 0.025 to about 0.5 $g/in^3$ of the first layer zirconium component; and
   - from about 0.025 to about 1.0 $g/in^3$ of the at least one first layer oxygen storage composition; and the second layer comprises;
   - from about 0.001 $g/in^3$ to about 0.03 $g/in^3$ of a second layer rhodium component;
   - from about 0 to about 0.065 $g/in^3$ of a second layer platinum group component other than rhodium;
   - from about 0.15 $g/in^3$ to about 2.0 $g/in^3$ of the second layer support;
   - from about 0.025 to about 1.0 $g/in^3$ of the at least second layer oxygen storage composition; and
   - from about 0.025 to about 0.5 $g/in^3$ of the second layer zirconium component.

20. The layered catalyst composite as recited in claim 19 wherein at least one of the first and second layers further comprises from about 0.025 g/in$^3$ to about 0.5 g/in$^3$ of a nickel component.

21. The layered catalyst composite as recited in claim 19 wherein at least one of the first and second layers further comprises a particulate composite of zirconia and ceria which comprises 60 to 90 wt. % zirconia, 10 to 30 wt. % ceria and from 0 to 10 wt % rare earth oxides comprising lanthana, neodymia, yttria and mixtures thereof.

* * * * *